(12) United States Patent
Tedhams

(10) Patent No.: US 8,388,502 B2
(45) Date of Patent: Mar. 5, 2013

(54) SWIMMER TRAINING DEVICE

(75) Inventor: Marc Nathan Tedhams, Phoenix, AZ (US)

(73) Assignee: Rocket Industries, LLC., Phoenix, AZ (US)

( * ) Notice: Subject to any disclaimer, the term of this patent is extended or adjusted under 35 U.S.C. 154(b) by 519 days.

(21) Appl. No.: 12/768,516

(22) Filed: Apr. 27, 2010

(65) Prior Publication Data

US 2010/0285930 A1 Nov. 11, 2010

Related U.S. Application Data

(60) Provisional application No. 61/176,882, filed on May 9, 2009.

(51) Int. Cl.
*A63B 21/00* (2006.01)
(52) U.S. Cl. .............................. 482/54; 482/55; 482/56
(58) Field of Classification Search .................. 482/54, 482/55, 56, 102, 103, 98, 99
See application file for complete search history.

(56) References Cited

U.S. PATENT DOCUMENTS

| | | | |
|---|---|---|---|
| 3,835,493 A | 9/1974 | Grivna | |
| 3,861,675 A | 1/1975 | Hopper | |
| 4,071,236 A | 1/1978 | Oprean | |
| 4,074,904 A | 2/1978 | Arcidiacono | |
| 4,095,657 A | 6/1978 | Hohwart | |
| 4,247,096 A | 1/1981 | Schmitt | |
| 4,293,126 A | 10/1981 | Havens | |
| 4,302,007 A | 11/1981 | Oprean et al. | |
| 4,509,744 A | 4/1985 | Beasley | |
| 4,529,192 A | 7/1985 | Stites | |
| 4,530,497 A | 7/1985 | Moran et al. | |
| 4,684,122 A | 8/1987 | Desmond et al. | |
| 4,804,326 A | 2/1989 | Lennon | |
| 4,905,991 A | 3/1990 | Alston | |
| 4,962,923 A | 10/1990 | Earner | |
| 5,020,791 A | 6/1991 | Phillips | |
| 5,072,934 A | 12/1991 | Blanes | |
| 5,236,404 A | 8/1993 | MacLennan | |
| 5,385,521 A | 1/1995 | Weissbuch | |
| 5,391,080 A | 2/1995 | Bernacki et al. | |
| 5,468,200 A | 11/1995 | Hoffman | |
| 5,487,710 A | 1/1996 | Lavorgna et al. | |
| 5,601,514 A | 2/1997 | Horn | |
| 5,658,224 A | 8/1997 | Betrock | |
| 5,820,526 A | 10/1998 | Hoffman | |

(Continued)

FOREIGN PATENT DOCUMENTS

| | | |
|---|---|---|
| JP | 2005007111 A | 1/2005 |
| JP | 2005296567 A | 10/2005 |

OTHER PUBLICATIONS

PCT Notification for PCT/US2010/032584 dated Nov. 17, 2011.

(Continued)

*Primary Examiner* — Jerome W Donnelly
(74) *Attorney, Agent, or Firm* — Ingrassia Fisher & Lorenz, P.C.

(57) ABSTRACT

A swimmer training device includes a frame, a variable weight device, a first block, a second block, and a cable. The frame includes a bottom support section, a top section, and a plurality of support members. The first block is coupled to the top section, and comprises a plurality of first main pulleys that are each rotatable about a first axis. The second block is coupled to the variable weight device, and comprises a plurality of second main pulleys that are each rotatable about a second axis that is parallel to the first axis. The cable is wound at least partially around each of the first main pulleys and each of the second main pulleys, and extends from the top section of the frame.

20 Claims, 6 Drawing Sheets

U.S. PATENT DOCUMENTS

| | | | |
|---|---|---|---|
| 5,846,167 | A | 12/1998 | Liu et al. |
| 5,938,565 | A | 8/1999 | Bernacki |
| 6,176,815 | B1 | 1/2001 | Riera |
| 6,213,920 | B1 | 4/2001 | Ronca et al. |
| 6,634,993 | B1 | 10/2003 | Morr |
| 7,044,819 | B1 | 5/2006 | Dulemba |
| 7,104,932 | B1 | 9/2006 | Brentlinger |
| 7,175,569 | B1 | 2/2007 | Lan et al. |
| 2001/0046928 | A1 | 11/2001 | Nette |
| 2008/0161167 | A1 | 7/2008 | Ottaviani |

OTHER PUBLICATIONS

PCT International Search Report and Written Opinion for PCT/US2010/032584 mailed Dec. 23, 2010.

SWIMMER TRAINING DEVICE

PRIORITY CLAIMS

This application claims the benefit of U.S. Provisional Application No. 61/176,882, filed May 9, 2009.

TECHNICAL FIELD

The present invention generally relates to a training device, and more particularly relates to a training device for swimmers.

BACKGROUND

Competitive swimming has been, and continues to be, a relatively popular sport. Indeed, names such as Johnny Weissmuller and Mark Spitz evoke memories of great swimmers of past eras. In the present era, the name Michael Phelps stands alone as perhaps the most popular swimmer, if not one of the most popular athletes worldwide. These swimmers attained their notoriety by being fast, if not the fastest, at multiple swim strokes. This does not occur by mere happenstance, but through consistent and strenuous training One of the more popular training methods used by competitive swimmers is known as resistive swimming. That is, as a swimmer strokes, the swimmer's motion through the water is somehow resisted. Various devices have been used or proposed for implementing resistive swim training One of the more popular devices presently used resembles a parachute that is tethered to a swimmer. The parachute device extends behind the swimmer while in the water, and thus exhibits a resistive load with each stroke. This device does, however, suffer certain drawbacks. Namely, it may not exhibit a constant resistive load while it is being used. Moreover, the maximum resistive load it exhibits may not be variable.

Other devices have also been developed to provide resistive swim training. These devices, however, also suffer drawbacks. For example, with many of these devices a swimmer may experience a tug, a jerk, a catch, or loss of load during use.

Hence, there is a need for a resistive swimmer training device that exhibits a relatively constant resistive load while it is being used and/or does not result in the swimmer experiencing a tug, a jerk, a catch, and/or a loss of load during use. The present invention addresses one or more of these needs.

BRIEF SUMMARY

In one embodiment, and by way of example only, a swimmer training device includes a frame, a variable weight device, a first block, a second block, a first carrier pulley, a second carrier pulley, and a cable. The frame includes a bottom support section, a top section, and a plurality of support members. The bottom support section is configured to rest on a surface, and the top section is spaced apart from the bottom support section and is coupled thereto via the plurality of support members. The first block is coupled to the top section, and comprises a plurality of first main pulleys that are each rotatable about a first axis. The second block is coupled to the variable weight device, and comprises a plurality of second main pulleys that are each rotatable about a second axis that is parallel to the first axis. The first carrier pulley is coupled to the top section and is rotatable about a third axis that is substantially perpendicular to the first axis. The second carrier pulley is coupled to the top section and is rotatable about a fourth axis that is parallel to the third axis. The clutch mechanism is coupled to the bottom support section. The cable has a first end and a second end. The cable is wound at least partially around each of the first main pulleys, each of the second main pulleys, the first carrier pulley, and the second carrier pulley, and extends from the top section of the frame.

In another exemplary embodiment, a swimmer training device includes a frame, a container, a first block, a second block, a first carrier pulley, a second carrier pulley, a clutch mechanism, and a cable. The frame includes a bottom support section, a top section, and a plurality of support members. The bottom support section is configured to rest on a surface, and the top section is spaced apart from the bottom support section and is coupled thereto via the plurality of support members. The container has an inner volume for receiving a liquid. The first block is coupled to the top section, and includes a plurality of first main pulleys. The second block is coupled to the container, and includes a plurality of second main pulleys. The first carrier pulley is coupled to the top section and is spaced apart from the first block. The second carrier pulley is coupled to the top section and is spaced apart from the first block and the first carrier pulley. The clutch mechanism is coupled to the bottom support section. The cable is wound at least partially around each of the first main pulleys, each of the second main pulleys, the first carrier pulley, and the second carrier pulley, and extends from the top section of the frame and through the clutch mechanism.

In another embodiment, a clutch mechanism includes a support structure, a cable clutch, a linkage mechanism, a drum, a flywheel, and a plurality of flyweights. The cable clutch is mounted on the support structure and is movable between a disengage position, in which a cable may move freely there-through, and an engage position, in which the cable is prevented from moving there-through. The linkage mechanism is mounted on the support structure, and is coupled to receive an engagement force and is configured, upon receipt thereof, to move the cable clutch to the engage position. The drum is rotationally mounted on the support structure and is configured to selectively supply the engagement force to the linkage mechanism. The drum has an inner surface that defines an inner volume. The flywheel is rotationally mounted within the drum inner volume. The plurality of flyweights are mounted on the flywheel. The flyweights are configured to selectively engage the drum and thereby cause the drum to rotate and supply the engagement force.

Furthermore, other desirable features and characteristics of the swimmer training device disclosed herein will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
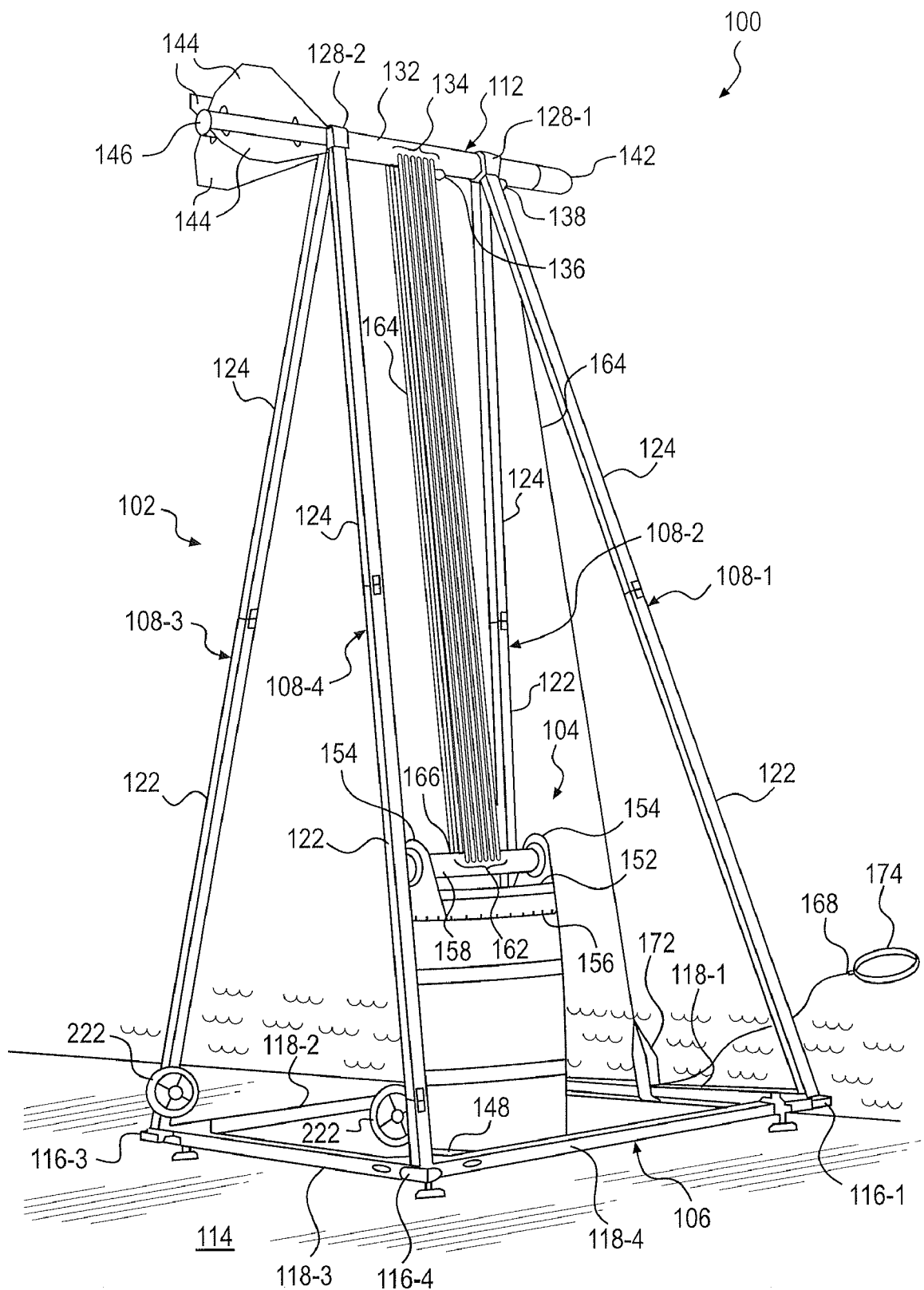
FIG. 1 depicts a perspective view of an exemplary embodiment of a swimmer training device of the present invention.

Referring now to FIG. 1, a perspective view of an exemplary embodiment of a swimmer training device 100 is depicted. The device 100 includes a frame 102 and a variable weight device 104. The frame 102 includes a bottom support section 106, a plurality of support members 108, and a top section 112. The bottom support section 106 is configured to rest on a surface 114, such as a pool deck, and is preferably square, or at least substantially square, in shape. It will be appreciated, however, that the bottom support section 106 could be implemented in numerous other shapes.

Nonetheless, the bottom support section 106, at least in the depicted embodiment, includes four (only three visible in FIG. 1) corner members 116 (e.g., 116-1, 116-2, 116-3, 116-4) and four side members 118 (e.g., 118-1, 118-2, 118-3, 118-4). As depicted most clearly in FIG. 2, each corner member 116 is coupled to two side members 118 via fasteners 202 that are threaded through lugs 204, one or both of which lugs could be like-threaded. on both the corner member 116 and the side member 118. In the depicted embodiment, the lugs 204 are welded to the corner members 116 and side members 118, but this is merely exemplary of one embodiment. In other embodiments the lugs 204 could be integrally cast with the corner member 116 and/or side 118 members.

Figure 2:
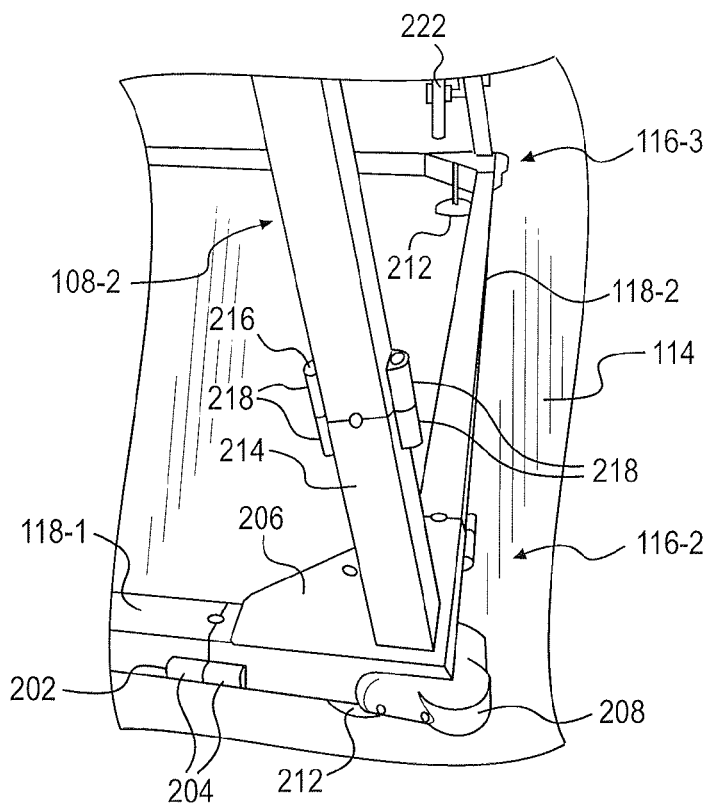
FIG. 2 depicts a close-up perspective view of an exemplary corner member that may be used to implement the training device of FIG. 1.

With continued reference to FIG. 2, it is seen that each corner member 116 additionally includes one or more reinforcement plates 206, a protective bumper 208, and an adjustable foot 212. Although only one reinforcement plate 206 is visible in FIG. 2, it will be appreciated that, at least in a preferred embodiment, two reinforcement plates 206 are coupled, one each, to the top and bottom of each corner member 116. In the depicted embodiment, the reinforcement plates 206 are each welded to the corner members 116. However, the reinforcement plates 206 could be coupled to the corner members 116 using any one of numerous alternative techniques or formed integrally therewith.

The protective bumpers 208 are coupled to each corner member 116 via, for example, suitable fasteners, and are preferably made of a suitably protective material, such as rubber. The protective bumpers 208 cover at least most of the outside corner of the corner members 116, thereby providing physical protection for a swimmer's foot. Each adjustable foot 212 is threaded into a like-threaded opening (not depicted) in the bottom side of one of the corner members 116. The adjustable feet 212 are used to provide adequate leveling and/or support for the frame 102 should the surface 114 be uneven.

As FIG. 2 additionally depicts, a support member interface post 214 is coupled to each corner member 116, and more specifically to the top reinforcement plate 206, near the outer corner. The support member interface posts 214 extend upwardly from the reinforcement plate 206 at a suitable angle, and are each coupled to one of the support members 108. In the depicted embodiment, each support member 108 is coupled to a support member interface post 214 via fasteners 216 that are threaded through like-threaded lugs 218 disposed on each support member interface post 214 and each support member 108. In the depicted embodiment, the lugs 218 are welded to the support member interface posts 214 and the support members 108, but this is merely exemplary of one embodiment. In other embodiments the lugs 218 could be integrally cast with the support member interface posts 214 and/or the support members 108. In a preferred embodiment, a wheel 222 is rotationally coupled to two of the support member interface posts 214. The wheels 222, which preferably are rotationally mounted on axles that are coupled to the two support member interface posts 214, may be used to transport the assembled frame 102 around the surface 114.

Returning once again to FIG. 1, it is seen that the frame 102 preferably includes four support members 108 (e.g., 108-1, 108-2, 108-3, 108-4). It will be appreciated, however, that other numbers of support members 108 could be used, if needed or desired. Although the support members 108 may be variously configured and implemented, in the depicted embodiment each includes a bottom member 122, a top member 124, and an alignment insert 302 (see FIG. 3). The bottom members 122 are each coupled to a support member interface post 214, as described above, and each top member 124 is coupled to one of the bottom members 122 and to the top section 112 of the frame 102. Although the top and bottom members 122, 124 may be variously implemented, in the depicted embodiment each is formed from square, hollow, structural aluminum tubes.

Figure 3:
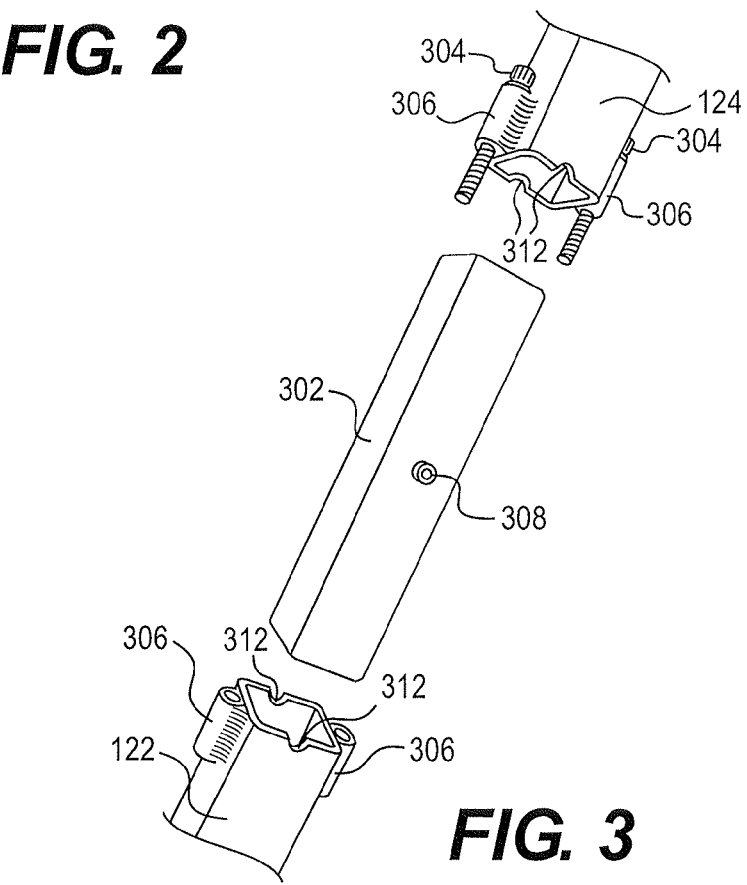
FIG. 3 depicts an exploded view of a joint between components of a support member that comprises the training device of FIG. 1.

No matter their specific implementation, the bottom and top members 122, 124 are coupled together, as shown most clearly in FIG. 3, via fasteners 304 that are threaded through like-threaded lugs 306 disposed on the mating ends of each member 122, 124. As may be appreciated from the description thus far, each bottom member 122 preferably has a set of lugs 218 on one end and a set of lugs 306 on its opposite end. However, each top member 124 preferably has a set of lugs 306 on only one end. In any case, as previously described, the lugs 306 are preferably welded to the ends of the top and bottom members 122, 124, but this is merely exemplary of one embodiment. In other embodiments the lugs 306 could be integrally cast with the top and bottom members 122, 124.

Each alignment insert 302 has a pair of alignment cap screws 308 (only one visible in FIG. 3) threaded therein on opposing sides. The alignment cap screws 308 mate with alignment cuts 312 that are formed in the mating ends of the top and bottom members 122, 124. It will be appreciated that the alignment inserts 302 preferably facilitate alignment of the bottom and top members 122, 124, and also provide additional structural integrity. It will be appreciated that in some embodiments the alignment inserts 302 could be eliminated, and that in other embodiments the alignment inserts 302 could be integrally formed as part of one of the bottom members 122 or top members 124.

The support members 108 may be coupled to the top section 112 using any one of numerous devices and techniques. In the depicted embodiment, however, the support members 108 are coupled to the top section 112 via a plurality of collars 128. In particular, a first pair of support members 108-1, 108-2 (which may be referred to herein as front support members) are coupled to a front collar 128-1, and a second pair of support members 108-3, 108-4 (which may be referred to herein as rear support members) are coupled to a rear collar 128-2. In a particular preferred embodiment, each collar 128 is coupled to its associated pair of support members 108 via non-illustrated fasteners that extend into associated threads disposed or formed in the ends of the support members. The collars 128 wrap around the top section 112, an embodiment of which will now be described.

The top section 112 comprises a first substantially hollow conduit 132. The first substantially hollow conduit 132 has a plurality of cable openings formed therein. The cable openings include two sets of pulley cable openings 134 (only one set visible in FIG. 1), a first fairlead cable opening 136, and a second fairlead cable opening 138. The purpose of each of these cable openings 134, 136, 138 will be discussed momentarily. The depicted top section 112 also includes a nose cone 142 and a plurality of fins 144. These are provided for aesthetic purposes only and do not serve any particular function. It is noted that the first substantially hollow conduit 132 may also be configured to allow a non-illustrated wheel to be selectively inserted into an opening in the end 146 opposite the nose cone 142. This wheel, together with the wheels 222 on the bottom support section 106, facilitates movement of the fully assembled frame 102.

Before proceeding further, it was previously noted that the support member interface posts 214 extend upwardly at an angle. Concomitantly, the support members 108 extending upwardly from the bottom support section 106, toward the top section 112, at an angle. As a result, in accordance with the preferred embodiment, when the frame 102 is assembled it has somewhat of a pyramid-like shape. This provides the advantage of the frame 102 becoming more stable as the weight of the variable weight device 104 is increased.

Turning now to the variable weight device 104, it is seen that in the depicted embodiment it is implemented as a container. The container 104 preferably has a closed bottom 148, an open top 152, and an inner volume for receiving a liquid. As may thus be appreciated, the weight of the container 104 may be varied by varying the volume of liquid that is disposed within its inner volume. It will be appreciated that the liquid container may vary in size, and hence the maximum volume of liquid that it may contain. In the depicted embodiment the liquid container 104 has an inner volume sufficient to contain approximately 60 gallons of water. It will additionally be appreciated that a liquid container is merely one example of a device that may be used to implement the variable weight device 104, and that various other devices may be used. For example, a device in or to which various fixed weights may be selectively added and removed could also be used.

Figure 4:
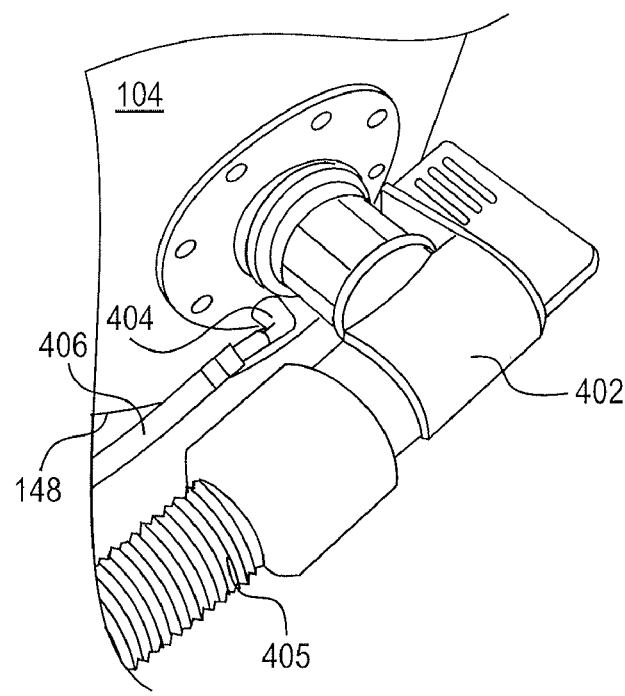
FIG. 4 depicts a close-up view of a portion of a container that may be used to implement the training device of FIG. 1, illustrating various means for removing liquid from the container.

In the preferred embodiment, in which the variable weight device 104 is a container, it is noted that liquid may be added or removed via a hose, a bucket, a pump, or various other fluid conveyance means. In a particular preferred embodiment, and as shown most clearly in FIG. 4, a valve 402 is coupled to the container 104 proximate the closed bottom 148. The valve 402 extends through the container 104 to the inner volume and is movable between an open position and a closed position. In the closed position, any liquid within the container 104 that is above the level of the valve 402 will not flow through the valve 402. Conversely, in the open position, any liquid within the container 104 that is above the level of the valve 402 will flow through the valve 402. A hose 405 or other suitable conduit may be coupled to the valve to direct the fluid to a desired drain location. To facilitate the removal of any liquid from the container 104 below the level of the valve 402, the container 104 may further include a siphon tap 404. The siphon tap 404 is preferably coupled to the container 104 below the valve 402 and, like the valve 402, extends through the container 104 to the inner volume. The siphon tap 404 may be configured to receive a tube 406, as depicted in FIG. 4, to direct the removed fluid to a desired drain location.

Returning once again to FIG. 1, it is seen that a yoke 154 is coupled to the container 104 proximate the open top 152. In particular, the yoke 154 is coupled to a belt 156 that wraps around, and is secured to, the container 104. The yoke 154 extends upwardly away from the container open top 152. A second substantially hollow conduit 158 extends through, and is supported by, the yoke 154. The second substantially hollow conduit 158, like the first substantially hollow conduit 132, includes a plurality of cable openings. Here, however, the second substantially hollow conduit 158 includes only two sets of pulley cable openings 162 (again, only one set visible in FIG. 1).

Figure 5:
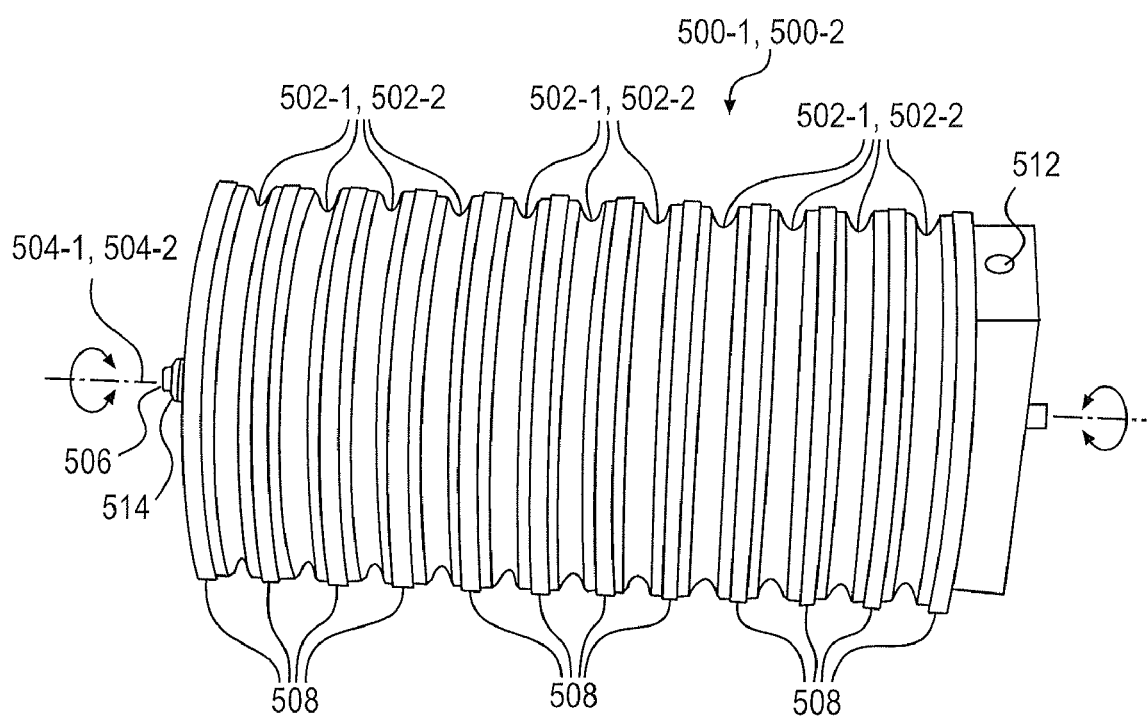
FIG. 5 depicts an example embodiment of a block that may be used to implement the training device of FIG. 1.

The variable weight device 104 is moved relative to the frame 102 via a block-and-tackle mechanism. The block-and-tackle mechanism, which is not fully visible in FIG. 1, includes a first block and a second block. The first block is coupled to the top section 112 and includes a plurality of first main pulleys, and the second block is coupled to the variable weight device 104 and includes a plurality of second main pulleys. More specifically, the first block is housed within the first substantially hollow conduit 132, and the second block is housed within the second substantially hollow conduit 158. The first block and second block are substantially identical. An embodiment of a particular preferred embodiment of the first and second blocks is depicted in FIG. 5, and with reference thereto will now be described.

The first and second blocks 500-1, 500-2 each include a plurality of main pulleys 502 (e.g., first main pulleys 502-1, second main pulleys 502-2) that are rotatable about an axis 504 (e.g., a first main axis 504-1, a second main axis 504-2). With quick reference back to FIG. 1, it may be readily appreciated that when the first and second blocks 500-1, 500-2 are housed within the first and second substantially hollow conduits 132, 158, the first and second rotational axes 504-1, 504-2, while not co-axial, are, however, parallel.

Referring back to FIG. 5, the main pulleys 502 are preferably implemented using sealed bearing cable pulleys, and are rotationally mounted, via the sealed bearings, on a shaft 506. Each main pulley 502 is disposed between two radial load bearing disks 508, which are also mounted on the shaft 506. The shaft 506 is non-rotationally coupled to a mounting block 512 via, for example, suitable fasteners 514 (only one visible). To facilitate this, the ends of the shaft 506, at least in the depicted embodiment, are preferably threaded. The mounting block 512 serves to axially locate the main pulleys 502. In the depicted embodiment the first and second blocks 500-1, 500-2 each include eleven main pulleys 502 and twelve radial load bearing disks 508. However, in various other embodiments the first and second blocks 500-1, 500-2 may be implemented using more or less than this number main pulleys 502 and radial load bearing disks 508. In this regard, it will be appreciated that the number of pulley cable openings 134, 162 in the first and second substantially hollow conduits 132, 158 may vary, but preferably match the number of main pulleys 502.

The first and second blocks 500-1, 500-2, as noted above, are housed within the first and second substantially hollow conduits 132, 158, respectively. It may thus be appreciated that the main pulleys 502 each have a maximum outer diameter that is less than the inner diameter of the first and second substantially hollow conduits 132, 158. The outer diameter of the radial load bearing disks 508 are also less than the inner diameter of the first and second substantially hollow conduits 132, 158, but are larger in diameter than that of the main pulleys 502. Thus, when a load is applied to the first and second blocks 500-1, 500-2, the radial load bearing disks 508 carry the load while the main pulleys 502 remain free to rotate. It will be appreciated that the specific diameters of the first and second substantially hollow conduits 132, 158, the main pulleys 502, and the radial load bearing disks 508 may vary as needed or desired.

With reference once again back to FIG. 1, a cable 164 having a first end 166 and a second end 168 is wound at least partially around each of the first and second main pulleys 502. The cable first end 166, at least in the depicted embodiment, is secured to the second substantially hollow conduit 158, and is thus movable with the variable weight device 104. The cable 164, after being wound at least partially around each of the main pulleys 502 of the first and second blocks 500-1, 500-2 in an alternating top-to-bottom sequential order, enters the first substantially hollow conduit 132 via the first fairlead cable opening 136. The cable 164 is then wound at least partially around a carrier pulley assembly (not visible in FIG. 1), and exits the first substantially hollow conduit 132 via the second fairlead cable opening 138. The cable 164 then extends downward toward the bottom support section 106, and extends through a clutch mechanism 172. It will be appreciated that the cable 164 may be implemented using any one of numerous suitable ropes, cords, or chains, just to name a few. The size and composition of the cable 164 may also vary depending, for example, on the size of the first and second main pulleys 502. In a particular embodiment, a 3/16-inch, double-braided, low-stretch, polyester rope, approximately 250 feet in length, is used.

Figure 6:
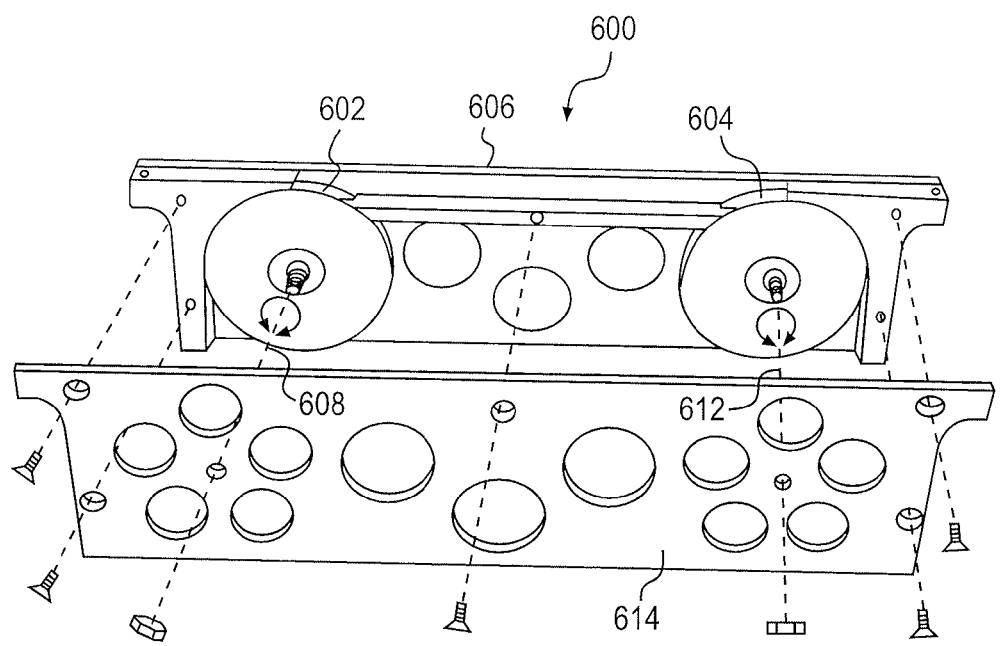
FIG. 6 depicts an example embodiment of a carrier pulley assembly that may be used to implement the training device of FIG. 1.

The carrier pulley assembly is preferably housed within the first substantially hollow conduit 132. An embodiment of a particular configuration of the carrier pulley assembly is depicted in FIG. 6, and with reference thereto will now be described. The carrier pulley assembly 600 includes a plurality of carrier pulleys. Although the number of carrier pulleys may vary, in the depicted embodiment the carrier pulley assembly 600 includes two carrier pulleys—a first carrier pulley 602 and second carrier pulley 604. The carrier pulleys 602, 604 are each rotationally mounted on a frame 606, and are preferably configured identical to, or at least substantially identical to, the first and second main pulleys 502. The first carrier pulley 602 is rotatable about a third rotational axis 608, and the second carrier pulley 604 is rotatable about a fourth rotational axis 612 that is parallel to the third rotational axis 608. It will be appreciated that when the first and second carrier pulleys 602, 604 are mounted within the first substantially hollow conduit 132, the third and fourth rotational axes 608, 612 are both substantially perpendicular to the first rotational axis 504-1

The frame 606 includes a removable cover 614 that, when removed from the frame 606, provides access to the first and second carrier pulleys 602, 604. The frame 606 is dimensioned to be housed within the first substantially hollow conduit 132, and is disposed between the first and second fairlead cable openings 136, 138. Preferably, the frame 606 is dimensioned and configured such that the cable 164, upon being inserted into the first fairlead opening 136, is directed onto, and wraps partially around, the first carrier pulley 602. The cable 164 then extends over to, and wraps partially around, the second carrier pulley 604, and is directed out the second fairlead cable opening 138.

Figure 7:
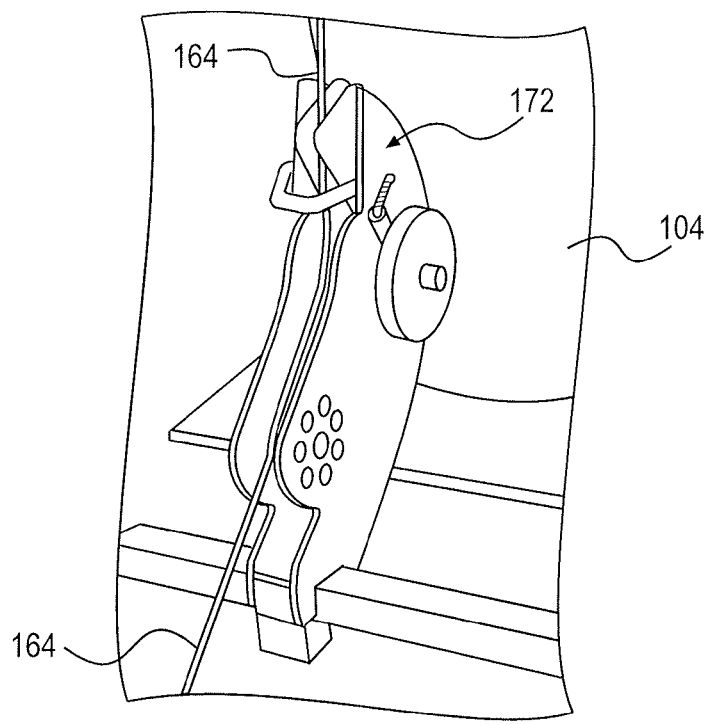
FIG. 7 depicts an example embodiment of a clutch mechanism mounted on the swimmer training device of FIG. 1 that may be used to implement the training device of FIG. 1.
Figure 8:
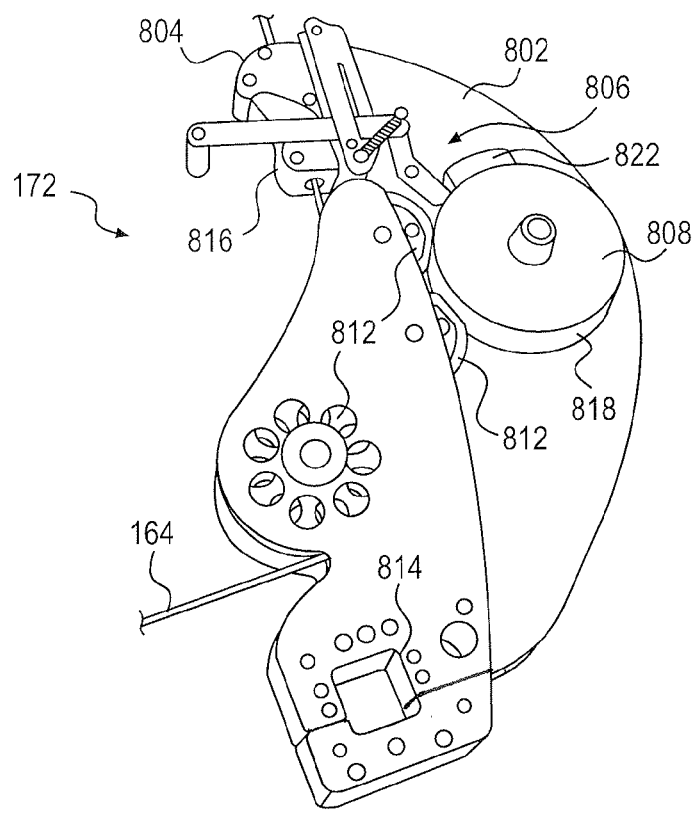
FIGS. 8 and 9 depict various views of the clutch mechanism of FIG. 7.
Figure 9:
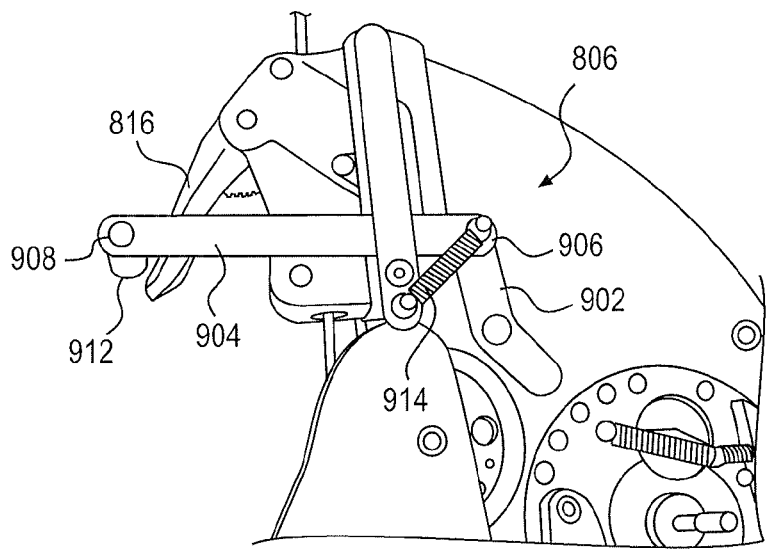

Once again referring to FIG. 1, it was noted above that the cable 164, upon exiting the top section 112 via the second fairlead cable opening 138, extends downward toward the bottom support section 106, and through the clutch mechanism 172. The clutch mechanism 172 is coupled to the bottom section 106, preferably midway between the front support members 108-1, 108-2. The clutch mechanism 172 is configured to selectively allow and prevent movement of the cable 164 therethrough. More specifically, the clutch mechanism 172 is configured to normally allow free movement of the cable 164 therethrough. However, in the unlikely event that the cable 164 is, for whatever reason, released from (or by) a swimmer while the variable weight device 104 is suspended off of the surface 114, the clutch mechanism 172 will engage the cable 164 and prevent further movement of the variable weight device 104. It will be appreciated that the clutch mechanism 172 may be variously configured and implemented. An embodiment of a particular implementation is, for completeness, depicted in FIG. 7 mounted on the swimmer training device 100. Additional views of the preferred clutch mechanism 172 are depicted in FIGS. 8 and 9, and with reference thereto will now be described in more detail.

The preferred clutch mechanism 172 includes a support structure 802, a cable clutch 804, a linkage mechanism 806, a drum 808, and a plurality of pulleys 812. Support structure 802 is configured to be selectively mounted on, and removed from, the frame 102, and more specifically the bottom support section 106 of the frame 102. To facilitate this, an opening 814 extends through the support structure 802. Preferably, the opening 814 has a cross section that is shaped substantially identical to the perimeter of the side members 118. The support structure 802 is also preferably configured to allow its mounting and removal onto one of the side members 118 (preferably the front side member 118-1) without having to disassemble all or portions of the bottom support section 106.

The cable clutch 804 is mounted on the support structure 802 and is movable between an engage position and a disengage position. In the engage position, which is the position depicted in FIG. 8, the cable 164 is prevented from moving through the cable clutch 804. Conversely, in the disengage position, which is the position depicted in FIG. 9, the cable 164 may move freely through the cable clutch 804. As may be readily seen in FIGS. 8 and 9, the cable clutch includes a lever 816 that is movable between a first position and a second position. When the lever 816 is in the first position (FIG. 9), the cable clutch 804 is concomitantly in the disengage position, and when the lever is in the second position (FIG. 8), the cable clutch is concomitantly in the engage position. It will be appreciated that the cable clutch 804 may be variously configured and implemented. In the depicted embodiment, however, the cable clutch 804 is implemented using a marine rope clutch, such as any one of numerous rope clutches manufactured and sold by Spinlock Ltd.

The linkage mechanism 806 is mounted on the support structure 802, and is coupled to receive an engagement force from the drum 808. The linkage mechanism 806 is further configured, upon receipt of the engagement force, to move the cable clutch 804 to the engage position. More specifically, the linkage mechanism 806, upon receipt of the engagement force, engages the lever 816 and moves it to its second position, thereby causing the cable clutch 804 to move to the engage position. Although the linkage mechanism 806 may be variously implemented, in the depicted embodiment, as is shown more clearly in FIG. 9, it includes a first link 902 and a second link 904. The first link 902 is rotationally mounted on the support structure 802 and, in a manner that will be described more fully below, is selectively engaged by the drum 808. The first link 902, when engaged by the drum 808, rotates in a clockwise direction (as viewed in FIGS. 8 and 9). The second link 904 has a first end 906 and a second end 908. The first end 906 is coupled to the first link 902, and the second end 908 is coupled to an engagement handle 912. With this configuration, when the first link 902 rotates in the clockwise direction, the second link 904 translates to the right (as viewed in FIGS. 8 and 9) and engages the lever 816, moving the lever 816 to its second position and thereby causing the cable clutch 804 to move to the engage position. In the preferred embodiment, a bias spring 914 supplies a bias torque to the linkage mechanism 806 that biases the first link 902 to rotate in the counterclockwise direction.

Figure 10:
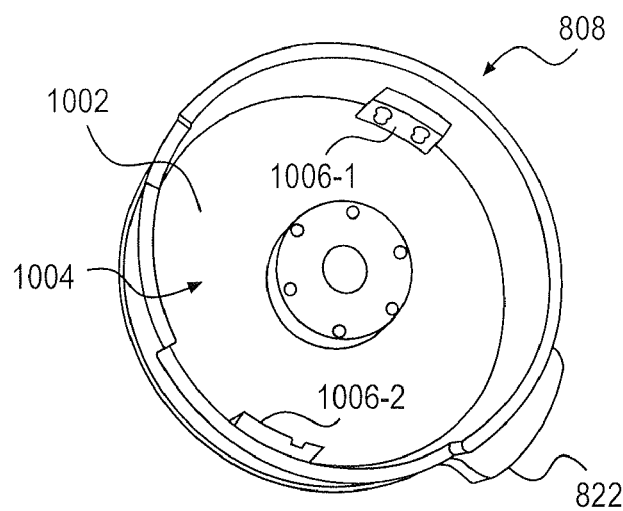
FIGS. 10 and 11 depict various components that comprise the clutch mechanism of FIG. 7.

Returning to FIG. 8, the drum 808 is rotationally mounted on the support structure 802 and, as was already noted, is configured to selectively supply the engagement force to the linkage mechanism 806. The drum 808 has an outer surface 818 and, as shown more clearly in FIG. 10, an inner surface 1002. A linkage mechanism engagement stub 822 is coupled to the drum outer surface 818 and at least selectively engages the first link 902, to thereby selectively supply the engagement force thereto. The drum inner surface 1002 defines an inner volume 1004. A plurality of cogs 1006 (e.g., 1006-1, 1006-2) are coupled to the drum inner surface 1002 and, as will now be described, are selectively engaged by a device, which causes the drum 808 to rotate and supply the engagement force to the linkage mechanism 806.

Figure 11:
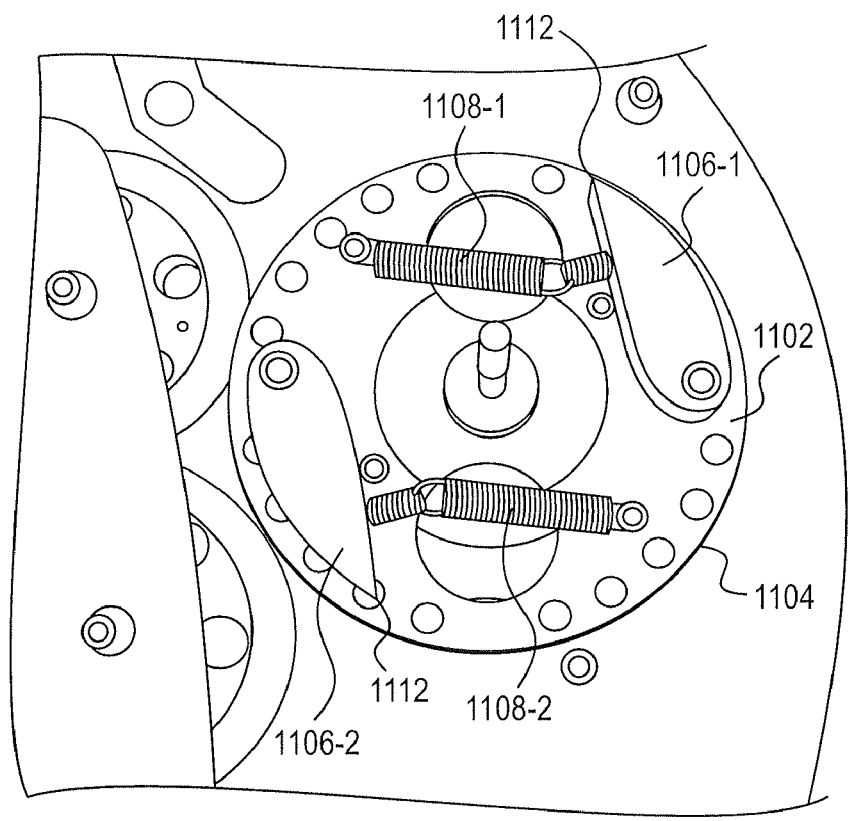

Referring now to FIG. 11, a flywheel 1102 is rotationally mounted within the drum inner volume 1002. More specifically, the flywheel 1102 is mounted on a flywheel pulley 1104 that is rotationally mounted on the support structure 802 and surrounded by the drum 808 (when the drum 808 is installed). The cable 164 (not visible in FIG. 11) is wrapped almost entirely around the flywheel pulley 1104. A plurality of flyweights 1106 (e.g., 1106-1, 1106-2) are rotationally mounted on the flywheel 1102. The flyweights 1106 are configured to selectively engage the drum 808, and more specifically the cogs 1006, and thereby cause the drum 808 to rotate and supply the engagement force to the linkage mechanism 806. In particular, the flyweights 1106 are biased, via sets of bias springs 1108 (e.g., 1108-1, 1108-2), away from the cogs 1006. However, when the flywheel 1102 is rotated at a predetermined rotational rate in the counterclockwise direction (as viewed in FIG. 11) the flyweights 1106 rotate against the force of the bias springs 1108 and the tips 1112 thereof engage the cogs 1106.

The clutch mechanism 172, as noted above, is configured to normally allow free movement of the cable 164 therethrough. In the unlikely event that the cable 164 is, for whatever reason, released from (or by) a swimmer while the variable weight device 104 is suspended off of the surface 114, the variable weight device 104 will begin acceleration, under the force of gravity, toward the surface 114. As the variable weight device 104 accelerates, the rotational speed of the flywheel pulley 1104 will concomitantly increase. When the predetermined rotationally speed is attained, the flyweights 1106 will engage the cogs 1006 and cause the drum 808 to rotate. The engagement stub 822 on the drum outer surface 818 engages the linkage mechanism 806 and supplies the engagement force thereto. The linkage mechanism 806, in turn, engages the lever 816 and moves it to its second position, thereby causing the cable clutch 804 to move to the engage position. In the engage position, further movement of the cable 164, and thus the variable weight device 104, is prevented.

The swimmer training device 100 may be assembled on dry land, a pool deck, or any one of numerous other suitable surfaces 114. When assembled as depicted in FIG. 1, the cable 164 may be tethered about a swimmer (not shown) via, for example, a suitable belt 174 that may be readily coupled to and removed from the cable 164. With the variable weight device 104 loaded to a desired weight (e.g., filled with a suitable volume of liquid), the swimmer may then alternately swim away from and swim toward the device. When swimming away from the device 100, the swimmer will experience a resistance force. Conversely, when swimming toward the device 100, the swimmer will experience an assistance force. Thus, the swimmer training device 100 may enable two different types of training, and does so without the swimmer experiencing a tug, jerk, catch, or loss of load associated with presently known swimmer training devices.

It will be appreciated that the overall configuration and dimensions of the swimmer training device 100, and its individual components and subassemblies, described herein may vary as needed or desired. In a particular preferred implementation, the swimmer training device 100 is configured and dimensioned such that a swimmer may swim up to 50 meters, the length of a standard competitive swimming pool.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A swimmer training device, comprising:
    a frame comprising a bottom support section, a top section, and a plurality of support members, the bottom support section configured to rest on a surface, the top section spaced apart from the bottom support section and coupled thereto via the plurality of support members;
    a variable weight device;
    a first block coupled to the top section, the first block comprising a plurality of first main pulleys, each of the first main pulleys rotatable about a first axis;
    a second block coupled to the variable weight device, the second block comprising a plurality of second main pulleys, each of the second main pulleys rotatable about a second axis that is parallel to the first axis;
    a first carrier pulley coupled to the top section and rotatable about a third axis that is substantially perpendicular to the first axis;
    a second carrier pulley coupled to the top section and rotatable about a fourth axis that is parallel to the third axis; and
    a cable having a first end and a second end, the first end movable with the variable weight device, the cable wound at least partially around each of the first main pulleys, each of the second main pulleys, the first carrier pulley, and the second carrier pulley, and extending from the top section of the frame.

2. The swimmer training device of claim 1, wherein the first block further comprises:
    a mounting block;

a shaft non-rotationally coupled to the mounting block and extending substantially perpendicularly therefrom, each of the first main pulleys rotationally mounted on the shaft; and a plurality of radial load bearing disks mounted on the shaft, each of the first main pulleys disposed between two of the radial load bearing disks.

3. The swimmer training device of claim 1, wherein:
the top section comprises a substantially hollow conduit having a plurality of cable openings formed therein;
the first block is housed within the top section; and
the cable extends through each of the cable openings.

4. The swimmer training device of claim 3, wherein:
the first carrier pulley and the second carrier pulley are rotationally mounted within the top section.

5. The swimmer training device of claim 4, wherein:
the substantially hollow conduit has an inner diameter;
the first main pulleys each have a maximum outer diameter that is less than the inner diameter of the substantially hollow conduit;
the radial load bearing disks each have a diameter that is less than the inner diameter of the substantially hollow conduit and greater than the maximum outer diameter of the first main pulleys.

6. The swimmer training device of claim 1, wherein the variable weight device comprises a container having an inner volume for receiving a liquid.

7. The swimmer training device of claim 6, wherein the container comprises:
an open top;
a closed bottom; and
a valve coupled to the container proximate the closed bottom and extending through the container to the inner volume, the valve movable between an open position and a closed position.

8. The swimmer training device of claim 7, further comprising:
a siphon tap coupled to the container proximate below the valve and extending through the container to the inner volume.

9. The swimmer training device of claim 7, wherein the variable weight device further comprises:
a yoke coupled to the container proximate the open top, the yoke extending upwardly away from the container; and
a substantially hollow conduit coupled to the yoke and having a plurality of cable openings formed therein.

10. The swimmer training device of claim 9, wherein the second block further comprises:
a mounting block;
a shaft non-rotationally coupled to the mounting block and extending substantially perpendicularly therefrom, each of the second main pulleys rotationally mounted on the shaft; and
a plurality of radial load bearing disks mounted on the shaft, each of the second main pulleys disposed between two of the radial load bearing disks.

11. The swimmer training device of claim 10, wherein:
the second block is housed within the substantially hollow conduit; and
the cable extends through each of the cable openings.

12. The swimmer training device of claim 9, wherein:
the substantially hollow conduit has an inner diameter;
the second main pulleys each have a maximum outer diameter that is less than the inner diameter of the substantially hollow conduit;
the radial load bearing disks each have diameter that is less than the inner diameter of the substantially hollow conduit and greater than the maximum outer diameter of the second main pulleys.

13. The swimmer training device of claim 1, further comprising:
a clutch mechanism coupled to the bottom support section, and through which the cable extends, the clutch mechanism configured to selectively allow and prevent movement of the cable there-through.

14. A swimmer training device, comprising:
a frame comprising a bottom support section, a top section, and a plurality of support members, the bottom support section configured to rest on a surface, the top section spaced apart from the bottom support section and coupled thereto via the plurality of support members;
a container having an inner volume for receiving a liquid;
a first block coupled to the top section, the first block comprising a plurality of first main pulleys;
a second block coupled to the container, the second block comprising a plurality of second main pulleys;
a first carrier pulley coupled to the top section and spaced apart from the first block;
a second carrier pulley coupled to the top section and spaced apart from the first block and the first carrier pulley;
a clutch mechanism coupled to the bottom support section; and
a cable wound at least partially around each of the first main pulleys, each of the second main pulleys, the first carrier pulley, and the second carrier pulley, and extending from the top section of the frame and through the clutch mechanism.

15. The swimmer training device of claim 14, wherein the clutch mechanism comprises:
a frame;
a cable clutch mounted on the frame and movable between an engage position, in which the cable may move freely there-through, and a disengage position, in which the cable is prevented from moving there-through;
a linkage mechanism mounted on the frame, the linkage mechanism coupled to receive an engagement force and configured, upon receipt thereof, to move the cable clutch to the engage position;
a drum rotationally mounted on the frame and configured to selectively supply the engagement force to the linkage mechanism, the drum having an inner surface that defines an inner volume;
a flywheel rotationally mounted within the drum inner volume; and
a plurality of flyweights mounted on the flywheel, the flyweights configured to selectively engage the drum and thereby cause the drum to rotate and supply the engagement force.

16. A clutch mechanism, comprising:
a frame;
a cable clutch mounted on the frame and movable between a disengage position, in which a cable may move freely there-through, and an engage position, in which the cable is prevented from moving there-through;
a linkage mechanism mounted on the frame, the linkage mechanism coupled to receive an engagement force and configured, upon receipt thereof, to move the cable clutch to the engage position;
a drum rotationally mounted on the frame and configured to selectively supply the engagement force to the linkage mechanism, the drum having an inner surface that defines an inner volume;
a flywheel rotationally mounted within the drum inner volume; and
a plurality of flyweights mounted on the flywheel, the flyweights configured to selectively engage the drum and thereby cause the drum to rotate and supply the engagement force.

17. The clutch mechanism of claim 16, further comprising:
a plurality of cogs coupled to the inner surface of the drum, each cog configured to be selectively engaged by one of the flyweights to thereby cause the drum to rotate.

18. The clutch mechanism of claim 16, further comprising:
a plurality of pulleys rotationally mounted on the frame and at least partially around which the cable may be wrapped.

19. The clutch mechanism of claim 16, further comprising:
a flywheel pulley rotationally mounted within the drum inner volume,
wherein:
the cable is at least partially wrapped around the flywheel pulley, and
the flywheel is mounted on the flywheel pulley.

20. The clutch mechanism of claim 16, further comprising:
a plurality of flyweight bias springs coupled between the flywheel and each of the flyweights, the flyweight bias springs supplying a bias force to the flyweights that urges the flyweights out of engagement with the drum.

* * * * *